United States Patent [19]

Civardi et al.

[11] 3,716,397
[45] Feb. 13, 1973

[54] TREATING MICROPOROUS MATERIAL

[76] Inventors: Frank Peter Civardi, 98 Kiwanis Drive, Wayne, N.J.; Hans-George Kuenstler, 149-32 12th Road, Whitestone, N.Y. 11357

[22] Filed: Dec. 21, 1970

[21] Appl. No.: 100,290

[52] U.S. Cl. ................117/77, 117/98, 117/119, 117/138.8 D, 117/163, 117/DIG. 9
[51] Int. Cl. .................................................B44d 1/02
[58] Field of Search...117/98, 98 F, 138.8 D, DIG. 9, 117/163, 119, 77

[56] References Cited

UNITED STATES PATENTS

| | | | |
|---|---|---|---|
| 2,995,512 | 8/1961 | Weidner et al. | 117/163 X |
| 3,232,786 | 2/1966 | Kellman | 117/98 F |
| 3,455,727 | 7/1969 | Dye | 117/138.8 D |

*Primary Examiner*—Edward G. Whitby
*Attorney*—Abner Sheffer and F. W. Wyman

[57] ABSTRACT

Microporous elastomeric sheet material, suitable for use in making shoe uppers, is pigmented throughout its thickness by impregnating it with a dilute aqueous pigmented latex, to deposit pigment within the micropores. Preferably the latex is anionic and the impregnated sheet is treated with acid; this produces a pigmented sheet of superior uniformity.

18 Claims, No Drawings

TREATING MICROPOROUS MATERIAL

This invention relates to the treatment of microporous sheet material, particularly fleeceless elastomeric sheet material for use in the manufacture of shoe uppers.

One type of microporous sheet material suitable for shoe uppers is an elastomeric sheet, preferably of elastomeric polyurethane, having a pore volume of over 40 percent, e.g., about 50–80 percent, typically about 60 percent, and substantially free of preformed fibrous reinforcing fabric. This material may be given a surface finish, as by treating its upper surface to produce thereon a thin relatively dense surface layer of pigmented polymer. (Such microporous materials, the finishing thereof and the nature and amounts of materials employed are described more fully in the copending application of Civardi and Kuenstler entitled "Surface Treatment" filed July 21, 1970 Ser. No. 56,936, whose entire disclosure is incorporated herein by reference.)

In accordance with one aspect of the present invention the microporous sheet material is pigmented throughout its thickness by impregnating it with a dispersion of pigment in a liquid non-solvent for the sheet material, depositing the pigment within the micropores thereof, and removing said non-solvent.

In a preferred form of the invention the amount and type of pigment that is so deposited within the sheet material is related to the pigment concentration in the final dense surface layer. Thus the concentration of pigment deposited within the micropores is generally less than the pigment concentration in the dense surface layer, e.g., some 10–60 percent, preferably about 20 to 40 percent of the pigment concentration in the dense surface layer. For example, if the material is to be treated to produce thereon a thin dense fused but breathable (water vapor permeable) surface layer whose black pigment concentration is, say about 6 to 10 percent (based on the weight of the dense surface layer), the sheet material (prior to formation of the surface layer) may be treated to deposit, and bond, say about 2 to 3 percent (based on the weight of the sheet material) of similar black pigment within the micropores. The resulting product, after the surface-finishing operation, will have a dark black surface and a gray body appearance, so that, at a cut edge of the sheet, there will be a marked contrast between the lighter cut edge and the darker top surface. However by burnishing the cut edge so as to fuse and densify the polymeric material there, the contrast is eliminated or markedly reduced, the formerly light edge being darkened, by densification, giving it an appearance similar to that of the top surface. In this way a smooth attractive, neat dense edge is obtained without the need for conventional more complicated operations, which involve skiving the material and folding it over so as to produce an edge at which the only finished top surface is visible. For best matching, of course, the colors of the pigments should be similar. For instance brown pigment should be deposited in the micropores when the surface layer is to be made brown. For colors other than black the pigment concentrations in the dense surface layer are generally above 10 percent, e.g. 15, 20, 30 or 40 percent and the amount of pigment deposited in the micropores is correspondingly higher.

The microporous sheet before treatment with the pigment, is preferably substantially free of coloring pigment. Because of its microporous structure it looks white even though the polymer of which it is made is substantially colorless; owing to yellowing or browning of the polymer, the microporous sheet may appear, say, cream-colored rather than pure white. It will be understood that the unpigmented microporous sheet material can be produced in large quantities and then, in accordance with this invention, different large pieces (e.g. rolls several feet in length) of the same sheet material can be pigmented with different colored pigments (e.g. one piece treated with black dispersion, another with brown, still another with blue, etc.) appropriate to the color of the surface-finishing to be applied to the individual large piece.

In a particularly suitable process, the microporous sheet material is impregnated with a pigmented latex which is a blend of a dispersed pigment with an aqueous emulsion of a polymer. The impregnated sheet is squeezed to express excess pigmented latex and then, with its internal surfaces still wet with the latex, is subjected to a precipitant for the polymer and pigment. In a preferred case, in which the polymer and pigment are dispersed in the aqueous medium with the aid of an anionic surfactant (alone or in admixture with a nonionic surfactant), the precipitant is suitably an acid, preferably a dilute aqueous solution of an acid (e.g. 5 percent aqueous HCl or 10 percent aqueous acetic acid). It has been found that it is sufficient to immerse the sheet into a bath of the precipitant. The material can then be rinsed, as in a water bath. This process yields products of improved color uniformity throughout the thickness and area of the sheet. In contrast, if the latex-impregnated sheet is simply allowed to dry, without the treatment with a precipitant, a much less evenly colored material is obtained, the concentration of pigment being greater near the surfaces of the sheet than in the interior, and, when a blend of pigments is used, the pigments tend to be uneven distributed, or partial separated, with respect to each other.

The pigmented latex should be one which has a small enough particle size (e.g. below 1 micron) to permit it to be forced into the interior of the microporous material. Preferably the pigmented latex is dilute, containing well below 20 percent solids and preferably well below 10 percent solids (e.g. about 1 to 6 percent) and is a stable latex which does not tend to coagulate or precipitate when worked during impregnation witn nip rollers. These properties can be easily determined by simple tests using water-diluted commercially available latices. Thus, it has been found for instance that excellent results are obtained, when the following latices are diluted and used in this invention: Rohm & Haas Rhoplex AC–61 which is an anionic polyacrylate latex containing 45–47 percent solids, having a pH of 9.5–10.0, a minimum film of formation temperature of 20° C and a clear film ultimate hardness (Tukon [KHN]) of 1.2; Rohm & Haas Rhoplex MV-1 which is an anionic polyacrylate latex containing 45.5–46.5 solids, having a pH of 9.0–10.0, a minimum film formation temperature of 8° C and a clear film ultimate hardness (Tukon[KHN]) of less than 1; Tylac FA562C which is an anionic carboxylated styrene modified butadiene-acrylonitrite copolymer latex containing 38 percent solids, having a pH of 8.5–9.0, and a viscosity less than 70 cps. Preferably, the polymer is one which forms a water-insoluble flexible film; advantageously it is an elastomer.

The pigment:polymer ratio in the latex may be varied. Preferably it falls within the range of about 0.3:1 to 2:1 more preferably about 1:1. The concentration of polymer in the pigmented latex may be, for instance in the range of about 1 to 5 percent, and the concentration of pigment in the pigmented latex may be, for instance, in the range of about 1 to 5 percent.

The pigmented latex may be impregnated into the microporous sheet material in various ways. One convenient method is by vacuum impregnation, e.g., by removing much of the air from the sheet material by placing the material under subatmospheric pressure (e.g. a pressure below 200mm Hg absolute, preferably below about 50 mm Hg absolute) in a vessel and drawing the pigmented latex into the evacuated sheet material. Impregnation may also be effected by passing the sheet material through a bath of the pigmented latex while alternately squeezing the sheet material to displace much of the air (as by means of nip rolls) and allowing the material to reexpand while in the bath of latex. The amount of pigmented latex is usually such as to deposit less than about 10 percent, e.g. about 1 to 6 percent, total solids (based on the weight of the dry sheet). For shoe upper materials it is most preferred that the amount deposited be less than that which materially affects the flexibility of the sheet material. The amount deposited may be regulated by controlling the concentrations of polymer and pigment in the pigmented latex and by controlling (by suitable adjustment of the squeeze rolls used for that purpose) the amount of excess pigmented latex expressed from the impregnated sheet prior to the precipitation step. Thus with a pigmented latex containing about 3 percent pigment and 3 percent polymer good results have been obtained by controlling the squeeze rolls so that the sheet retains about 80 to 100 percent, based on the original dry weight of the sheet, of pigmented latex. Generally the pore size of the sheet material is such that little if any impregnation into the sheet is attained on simply immersing it in a bath of the latex.

As indicated above, when the pigmented latex contains an anionic surfactant, precipitation can be readily effected with aqueous acid. Other precipitating agents to which the sheet polymer is inert will suggest themselves to those skilled in the art, e.g. solutions of electrolytes, e.g. NaCl or $Na_2SO_4$ of sufficiently high concentration, acid vapors (e.g. HCl), or solutions of salts whose cations (e.g. $Ca^{++}$) react with the anionic surfactant to give water-insoluble precipitates.

After the precipitation step, the sheet is preferably rinsed to remove precipitant (e.g. rinsed in water and squeezed thoroughly) and may then be treated to apply a fused pigmented surface layer thereto. Water is a preferred rinsing agent; other liquids, which do not dissolve the polymer making up the sheet or the deposited polymer, may be employed. In one especially suitable procedure, a surface of the rinsed wet sheet is treated with a pigmented solution of a polymer, (preferably a thermoplastic elastomeric polyurethane containing pigment dispersed therein) in a solvent which attacks the sheet material and is also miscible with the water (or other rinse liquid), whereby the liquid in the sheet acts to coagulate the applied pigmented solution in an adherent layer at said surface. A fused layer may be subsequently formed on this coagulated layer and the surface may be embossed or compressed to provide various grains or patent leather effects. Full details of various grains or patent leather effects. Full details of the process for applying this coagulated layer and of the subsequent formation of a fused layer thereon, as well as a description of the nature of the products so produced is given in the application of Civardi and Kuenstler previously mentioned, whose entire disclosures are incorporated herein by reference. Alternatively the sheet, after the precipitation step, may be dried and its surface treated directly with a solvent for the sheet polymer to form a fused layer thereon; preferably the solvent is applied here in the form of a solution containing a thermoplastic elastomeric polyurethane having a pigment dispersed therein, the procedure being the same as, or similar to, that used (in the previously mentioned Civardi and Kuenstler application) for the formation of the fused layer over an intervening coagulated layer.

The following Example is given to illustrate this invention further. In this application all proportions are by weight unless otherwise indicated.

EXAMPLE

In this Example the sheet material is an unpigmented microporous thermoplastic elastomeric polyurethane sheet about 1.7 mm thick and weighing about 800 grams per square meter. The sheet is composed of two integral layers of different densities, the upper layer (whose density is about $0.4 g/mm^3$) being thinner and less dense than the strength-giving lower layer.

The sheet is placed in a chamber which is evacuated until the pressure therein is below 50mm Hg absolute. A diluted pigmented latex containing 3 percent pigment and 3 percent polymer solids, and containing an anionic dispersing agent, is allowed to enter the chamber so that it impregnates the sheet. The sheet is then squeezed between nip rolls, outside the chamber, to express excess pigmented latex; at this stage the sheet carries about 90–100 percent (based on the dry weight of the sheet) of the pigmented latex; it is a light brown (tan) color, somewhat lighter than the color of the latex, but it does not carry a visible (to the naked eye) layer of pigmented latex on its outer surfaces.

The sheet is then directly immersed in a bath of 5 percent aqueous hydrochloric acid (at atmospheric pressure) for one minute, without squeezing, and then rinsed or dipped in tap water, and squeezed to express excess water. After drying in a hot air oven, the sheet is found to have gained about 3–5 percent in weight owing to the treatment. During the acid treatment, rinsing and subsequent squeezing, there is practically no visual evidence of pigment loss from the sheet. (In contrast, if the latex-impregnated sheet is not given the acid treatment but is directly rinsed and squeezed a great deal of color is expressed). It seems that the acid penetrates very rapidly into the latex-impregnated sheet (presumably by ion transport) even though the acid is a precipitant for the anionic surfactant of the latex and even though no squeezing or other physical treatment to aid in penetration is employed, despite the fact that the sheet is ordinarily not readily penetrated by acid; in contrast when the same dry untreated sheet, used as the starting material, is immersed in the acid and then blotted dry it retains less than 20 percent, based on its own weight, of the dilute acid and much of this is in small pockets on the rough bottom surface.

The physical characteristics, other than color, of the sheet (e.g. water-vapor transmission, flex life and strength) appear to be essentially unchanged by the treatment. Examination of the treated sheet with the scanning electron microscope indicate no significant changes and no discernible microscopic masses of coagulated latex When the treated material is given a brown finish as described in the previously mentioned Civardi and Kuenstler application its surface color is considerably darker than the color of the underlying sheet and, in shoemaking process, a cut edge (such as is formed in cutting out the parts that are to form a shoe upper) shows a lighter color than the finish. Burnishing the edge, however, (as by contact with a heated metal surface to melt the polyurethane) darkens the edge considerably so that there is little or no contrast, in color, between edge and top surface, in the finished shoe. For example the edges of the quarters and vamp of the stitchdown shoe shown on pages 230 and 231 of "Modern Footwear Materials & Processes" by W.E. Cohn (Fairchild Publications, 1969), and particularly those edges which are to be exposed in the finished shoe (e.g. the rearwardly exposed edges of the vamp, say at the tongue, and the forwardly facing edges of the quarters, say at the eyelet row) are burnished before the pieces are stitched together to form the upper. The burnishing can be effected, for instance by bringing the cut edge into contact with a hot roller which is at a temperature of say about 300 ° C, which is well above the melting point of the polyurethane, so as to form a thin continuous fused layer (say about 0.01 to 0.05 mm thick) at the edge while the thickness of the material is substantially unchanged.

In the foregoing Example the pigmented latex is prepared by mixing the anionic latex known as Tylac FA 562C (carboxylated styrene-modified butadiene-acrylonitire copolymer latex, which has a total solids content of 38 percent, a pH of 8.5–9.0, and a viscosity of less than 70 cps) with an aqueous dispersion of mixture of yellow, red and black pigments, (e.g. in a ratio of 40 yellow, 8 red, 1.5 black). This blend is then diluted with sufficient water to reduce its solids content to 6 percent.

The particle diameters of the pigment particles and polymer particles of the pigmented latex generally fall within the range of about 0.1 to 1 micron.

Similar results are obtained by substituting Rohm & Haas Rhoplex AC-61 or Rhoplex MV-1 for the Tylac latex.

The surfactants present in the dispersions used in this invention may be of the conventional type. Thus, typical anionic surfactants have a hydrophilic salt group (at one end of the molecule) attached to a hydrophobic (e.g. hydrocarbon) chain. The hydrophilic group may be, for instance, a sulfoxy-containing group such as a sulfate or sulfonate, as in tetrasodium N-(1,2-dicarboxy ethyl)-N-octadecylsulfosuccinate (Aerosol 22), dioctyl ester of sodium sulfosuccinic acid (Aerosol OT), lauryl alcohol sulfate (Duponol ME), or other higher alkyl sulfate such as 7-ethyl-2-methyl4-undecanol sodium sulfate (Tergitol 4), sulfonated castor oil, alkyl aryl sodium sulfonate (e.g. dodecyl or tridecyl benzene sodium sulfonate, such as Santomerse No. 3), alkyl aryl polyether sodium sulfonate (Triton X-200). As mentioned non-ionic surfactants may also be used. These generally have a long hydrophobic chain attached to a water-soluble polyethylene oxide group; examples are polyoxyethylated fatty alcohols (such as Emulphor ON870) or polyoxyethylated alkyl (e.g. nonyl) phenols (such as Tergitol NP-4 or Igepal CO-630, CO-890 or CO-970).

The latices used in the practice of this invention are usually made by emulsion polymerization. For instance, an acrylate emulsion may be made by polymerizing 40 parts of an acrylate ester (e.g. ethyl acrylate or methyl acrylate) in 55 parts of water in the presence of 3.9 parts of Triton X-200 (containing 28 percent of the surfactant active ingredient) and 1.1 parts of a 30 percent solution of hydrogen peroxide, at reflux temperature at atmospheric pressure, the monomer being added gradually, with stirring, during polymerization in a manner well known to the art; after polymerization is substantially complete the latex is cooled to room temperature and its pH is adjusted to, say, 9.0 by adding aqueous 28 percent ammonium hydroxide. As indicated, the polymer in the latex may be a copolymer having carboxyl groups (usually carboxylate salt groups). These latices are well known in the art, as shown, for instance, by the carboxylated latices (made with about 1 to 20 percent of carboxyl-containing monomer) described in such patents as Booth No. 3,366,588, Altobelli et al No. 3,223,663, Sutton No. 2,767,153, McDowell No. 3,037,881, Hurwitz No. 2,954,358 and McLaughlin et al No. 2,790,736; the general and specific disclosures of these patents with respect to the latices of carboxyl-containing copolymers and with respect to the pigment dispersions that may be mixed therewith are incorporated herein by reference.

While the invention finds its greatest utility for the treatment of fleeceless elastomeric sheet material it may also be used with those microporous materials in which there is a layer of microporous elastomeric material on a fibrous substrate (which substrate is preferably impregnated with elastomeric material.) The microporous layer on the substrate may be, for instance, over 0.1 mm in thickness (e.g. about 0.2, 0.3, or even 1 or 2 mm in thickness and its pores may constitute some 25–80 percent (e.g. about 50 or 60 percent) of the total volume of the microporous layer. Because of the small size of the micropores (below 100 microns and preferably well below 50 microns) the microporous layer absorbs only little, if any, water on simple immersion (without squeezing) in water free of surfactant; the volume of water so absorbed is well below 50 percent of the pore volume of the microporous layer. The substrate may be (as in several well known commercially available water-vapor prermeable leather substitute materials used for shoe uppers) a polyurethane-impregnated non-woven felted batt of fibers of polyester (e.g. polyethylene terephthalate). The burnishing may be effected so as to spread a thin layer of fused polyurethane to cover exposed cut fibers at the cut edge of the piece being burnished.

As indicated above, the treatment with pigmented latex does not greatly darken the sheet. Tabulated below are illustrative measurements of the color values and darkness of two sheets, first after treatment with pigmented latex (black pigmented in one case, brown pigmented in the other) and then after burnishing or melting. Measurements were made with a Hunter Color Difference Meter, of the Adams color difference, according to ASTM D 2244-68.

|   | Black pigmented before melting | Black pigmented after melting | Brown pigmented before melting | Brown pigmented after melting |
|---|---|---|---|---|
| L | 34 | 12 | 72.05 | 52.0 |
| a | +.75 | +.10 | +9.7 | +13.5 |
| b | +3.05 | +.60 | +15.0 | +23.5 |
| Δ L |  | −22 |  | −20.6 |
| Δ a |  | −.65 |  | −3.8 |
| Δ b |  | −2.45 |  | −8.5 |
| E |  | 22.2 |  | 22.7 |

It will be seen that = ΔL and E are well above 15 while Δ a and Δb are well below that value.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. Process for the treatment of microporous fusible elastomeric sheet material, said sheet material having a microporous elastomeric zone whose thickness is 0.1 mm to 2 mm and in which pores constitute 25 to 80 percent of the total volume of said zone, the size of the micropores of said zone being such that the volume of water absorbed by said zone on simple immersion in water is less than 50 percent of the pore volume of said zone, which process comprises impregnating said material with a dispersion of pigment in a liquid non-solvent for the sheet material to deposit the pigment within the micropores of said zone, and removing said non-solvent while retaining the microporosity of said zone and sheet material.

2. Process for the treatment of microporous fusible elastomeric sheet material which comprises impregnating said material with a dispersion of pigment in a liquid non-solvent for the sheet material to deposit the pigment within the micropores of said sheet material, removing said non-solvent while retaining the microporosity of said sheet material, and including the step of forming on a surface of sheet material, after said impregnation, a thin dense breathable pigmented surface layer whose color is like that of said deposited pigment whereby when a cut edge of said sheet material is heated to form a thin fused layer of said elastomeric material at said edge the color of said edge is similar to the color of said upper surface.

3. Process as in claim 1 in which said non-solvent is water containing an anionic surface active dispersing agent, and said sheet material is treated, after said impregnation, and before removal of the water, with a precipitating agent which reduces the surface activity of said dispersing agent whereby to form a wet pigmented sheet material whose pigment is fixed in non-migrating form within said micropores.

4. Process as in claim 3 in which said dispersion includes a latex of a high polymer.

5. Process as in claim 4 in which said precipitating agent is an acid and is used in amount such that rinsing and squeezing of the acid-treated sheet results in the expressing of substantially no color from the sheet.

6. Process as in claim 5 in which said dispersion includes a latex of an elastomer, contains less than 20 percent solids, and has a pigment:polymer ratio which is in the range of about 0.3:1 to 2:1.

7. Process as in claims 3 in which said dispersion includes a latex of an elastomer, contains less than 20 percent solids, and has a pigment:polymer ratio which is in the range of about 0.3:1 to 2:1 and the impregnation is effected by placing the sheet material under a subatmospheric pressure below 200 mm Hg absolute and drawing the pigmented latex into the evacuated sheet material.

8. Process for the treatment of microporous fusible water-insoluble elastomeric sheet material which comprises impregnating said material with a dispersion of pigment in a latex of elastomeric high polymer to deposit the pigment within the micropores of said sheet material, and removing the water of said latex while retaining the microporosity of said sheet material, said dispersion having a solids content of less than 20 percent and a pigment:polymer ratio which is in the range of about 0.3:1 to 2:1 and containing an anionic surface active dispersing agent, said sheet material being treated, after said impregnation, and before removal of the water, with an acid precipitating agent which reduces the surface activity of said dispersing agent whereby to form a wet pigmented sheet material whose pigment is fixed in non-migrating form within said micropores, the amount said acid being such that rinsing and squeezing of the acid-treated sheet results in the expressing of substantially no color from the sheet, said process being one in which said sheet material is a microporous polyurethane substantially free of fibrous reinforcement, said precipitating agent is an aqueous solution of acid to which said sheet material is inert, the concentration of polymer in said dispersion being in the range of about 1 to 5 percent, the concentration of pigment in said dispersion being in the range of about 1 to 5 percent, whereby to deposit an amount of solids in said sheet material which does not materially affect the flexibility of said sheet material and is in the range of about 1 to 6 percent total solids based on the weight of said sheet material, the wet sheet material is surface-treated after said precipitation with a pigmented solution of a polymer in a solvent which attacks said sheet material but is also miscible with the water in said sheet material whereby the water acts to coagulate the applied pigmented solution in an adherent layer at a surface of said sheet material.

9. Process as in claim 8 in which said pigmented solution contains polyurethane whereby to form an adherent coagulated pigmented polyurethane layer on said polyurethane sheet material and in which a fused pigmented polyurethane layer is thereafter formed on said coagulated layer, the color of the pigment of said fused layer being like that of said deposited pigment but said fused layer being distinctly darker than the body of the pigmented sheet material, the pigment content of the latter being such that when a cut edge thereof is heated to form a thin fused layer of polyurethane material at said edge the color of said edge is similar to the color of said upper surface.

10. Process as in claim 8 and including the step of rinsing said sheet material with water after said precipitation and prior to said surface treating.

11. Process as in claim 1 in which the total weight of material so deposited within said micropores of said zone less than about 10 percent of the weight of said microporous zone.

12. Process as in claim 11 in which said microporous zone has a pore volume of up to about 60 percent and said impregnation is such as to deposit said pigment within said micropores throughout the thickness of the microporous material.

13. Process as in claim 11 in which the impregnation is such that the microporous material is colored without forming on its outer surface a visible layer of pigmented dispersion.

14. Process as in claim 11 in which air is removed from said micropores to facilitate the penetration of said dispersion therein.

15. Process as in claim 14 in which the removal of air is effected by placing the sheet material under subatmospheric pressure.

16. Process as in claim 14 in which the removal of air is effected by squeezing the sheet material.

17. Process as in claim 14 and including the step of squeezing out a portion of the dispersion from the microporous material before removing the non-solvent.

18. Process as in claim 1 and including the step of forming a thin dense breathable pigmented surface layer on a surface of said microporous zone after said impregnation.

* * * * *